(12) United States Patent
Malamud et al.

(10) Patent No.: US 8,699,944 B2
(45) Date of Patent: Apr. 15, 2014

(54) DEVICE PAIRING USING DEVICE GENERATED SOUND

(75) Inventors: Mark A. Malamud, Seattle, WA (US); Edward K. Y. Jung, Bellevue, WA (US); Royce A. Levien, Lexington, MA (US); Robert W. Lord, Seattle, WA (US); Alexander J. Cohen, Mill Valley, CA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1119 days.

(21) Appl. No.: 11/150,858

(22) Filed: Jun. 10, 2005

(65) Prior Publication Data

US 2006/0282649 A1 Dec. 14, 2006

(51) Int. Cl.
*H04B 7/24* (2006.01)
*H04B 5/00* (2006.01)
*H04B 7/00* (2006.01)
*H04M 1/66* (2006.01)
*H04M 3/00* (2006.01)
*H04M 1/00* (2006.01)
*H04B 1/00* (2006.01)
*G10L 21/00* (2013.01)

(52) U.S. Cl.
USPC .......... 455/39; 704/270; 704/270.1; 704/273; 704/275; 455/418; 455/419; 455/420; 455/411; 455/569.1; 455/41.1; 455/41.2

(58) Field of Classification Search
USPC .............................. 704/275, 270, 270.1, 273; 455/418–420, 11, 411, 569.1
See application file for complete search history.

(56) References Cited

U.S. PATENT DOCUMENTS

| | | | |
|---|---|---|---|
| 5,805,672 A | 9/1998 | Barkat | |
| 6,154,727 A * | 11/2000 | Karp et al. | 705/3 |
| 6,377,825 B1 | 4/2002 | Kennedy | |
| 6,480,825 B1 * | 11/2002 | Sharma et al. | 704/270 |
| 6,529,875 B1 * | 3/2003 | Nakajima et al. | 704/275 |
| 6,867,965 B2 * | 3/2005 | Khoo | 361/686 |
| 6,961,541 B2 * | 11/2005 | Overy et al. | 455/41.2 |
| 7,050,834 B2 * | 5/2006 | Harwood et al. | 455/563 |
| 7,072,886 B2 | 7/2006 | Salmenkaita et al. | |
| 7,088,220 B2 * | 8/2006 | Kotzin | 340/5.82 |
| 7,254,708 B2 * | 8/2007 | Silvester | 713/170 |
| 7,363,505 B2 | 4/2008 | Black | |
| 7,778,601 B2 | 8/2010 | Seshadri et al. | |
| 7,925,022 B2 | 4/2011 | Jung et al. | |
| 2002/0065663 A1 * | 5/2002 | Thomas et al. | 704/275 |
| 2002/0137505 A1 | 9/2002 | Eiche | |
| 2003/0162556 A1 * | 8/2003 | Libes | 455/507 |
| 2004/0073795 A1 * | 4/2004 | Jablon | 713/171 |

(Continued)

OTHER PUBLICATIONS

"Cellport Announces First Universal, Hands-Free Cell Phone System for Cars"; Intelligent Transportation Society of America; Bearing a date of Jul. 16, 2001; pp. 1-2; printed on Feb. 24, 2006; located at: http://www.itsa.org/itsnews.nsf/key/5fAA?OpenDocument; Intelligent Transportation Society of America.

(Continued)

*Primary Examiner* — Paras D Shah (57) ABSTRACT

A system comprising includes a first device, a second device, and logic to enable the first and second devices to pair as a result of at least one sound.

22 Claims, 3 Drawing Sheets

(56) References Cited

U.S. PATENT DOCUMENTS

| | | | |
|---|---|---|---|
| 2004/0123106 A1 | 6/2004 | D'Angelo et al. | |
| 2004/0132510 A1* | 7/2004 | Yamashita | 455/575.2 |
| 2004/0246607 A1* | 12/2004 | Watson et al. | 359/872 |
| 2004/0248513 A1 | 12/2004 | Glass et al. | |
| 2005/0010417 A1* | 1/2005 | Holmes | 704/275 |
| 2005/0044372 A1* | 2/2005 | Aull et al. | 713/176 |
| 2005/0048961 A1* | 3/2005 | Ribaudo et al. | 455/419 |
| 2005/0221829 A1* | 10/2005 | Nishida et al. | 455/440 |
| 2005/0266798 A1 | 12/2005 | Moloney et al. | |
| 2006/0019605 A1* | 1/2006 | Shau | 455/66.1 |
| 2006/0046719 A1 | 3/2006 | Holtschneider | |
| 2006/0068842 A1* | 3/2006 | Sanguino et al. | 455/556.2 |
| 2006/0116107 A1* | 6/2006 | Hulvey | 455/411 |
| 2006/0267860 A1 | 11/2006 | Rinaldo, Jr. et al. | |
| 2007/0173212 A1* | 7/2007 | Mergler | 455/92 |

OTHER PUBLICATIONS

"eCash On the Move at Volkswagen"; iButton Applications/Dallas Semiconductor MAXIM, Bearing a date of 2006; pp. 1-2; printed on Feb. 27, 2006; located at: http://www.maxim-ic.com/products/ibutton/applications/index.cfm?Action=DD&id=21; Maxim Integrated Products.

"Ecma welcomes ISO/IEC adoption of NFC Standard for short range wireless communication"; ecma International; Bearing a date of Dec. 8, 2003; printed Feb. 24, 2006; pp. 1-3; located at: http://www.ecma-international.org/news/Ecma-340-NFCIP-1.htm.

"Industry giants tout touch computing"; Computing; Bearing the dates of 1995-2006; pp. 1-2; printed Feb. 24, 2006; located at http://www.computing.co.uk/vnunet/news2124597/industry-giants; vnu business publications.

Kiser, Ken; "Newall Electronics Introduces Wearable DRO Technology"; Industrial Product News Online; pp. 1-2; printed Feb. 24, 2006; located at: http://www.ipnews.com/archives/dro/jan02/newall%5Felect.htm.

Cameron, Casey et al.; "Knuckletop Computing: The Java Ring"; pp. 1-4; located at: http://java.sun.com/features/1998/03/rings.html.

Lewis, John; "Put on your human-maching interface"; Design News; Bearing dates of Aug. 20, 2001 and 1997-2006; pp. 1-4; printed Feb. 24, 2006; located at: http://designnews.com/artice/CA150040.html; Reed Business Information.

"Mass Transit in Istanbul, Turkey" and "Parking in Argentina"; iButton Applications/Dallas Semiconductor MAXIM; Bearing a date of 2006; pp. 1-3; printed Feb. 27, 2006; located at: http://www.maxim-ic.com/products/ibutton/applications/index.cfm?Action=DD&id=8; Maxim Integrated Products.

"Near Field Communication"; What You Need to Know About; Bearing a date of 2006; pp. 1-3; printed on Mar. 3, 2006; located at: http://experts.about.com/e/n/ne/Near_Field_Communication.htm; About, Inc.

"Near Field Communication"; Wikipedia; Bearing a date of Feb. 17, 2006; pp. 1-2; printed on Feb. 24, 2006; located at: http://en.wikipedia.org/wiki/Near_Field_Communication.

"Secure Website Logon and Transactions"; iButton Applications; Bearing a date of 2004; pp. 1-2; located on Mar. 3, 2006; located at: http://72.14.207.104/search?q=cache:4JM396tN_ToJ:db.maxim-ic.com/ibutton/applications/index.cfm; Maxim/Dallas Semiconductor Corp.

"Miscellaneous Voice Pairing Material;" miscellaneous publications.

"Miscellaneous Sources for Near Field Communications;" miscellaneous publications.

ECMA International, "Near Field Communication," Ecma/TC32-TG19/2004/1.

* cited by examiner

DEVICE PAIRING USING DEVICE GENERATED SOUND

TECHNICAL FIELD

The present disclosure relates to the pairing of two devices for trusted cooperation.

BACKGROUND

Pairing involves establishing a communication channel between devices. Pairing is becoming more common in a world increasingly populated by cooperating devices. However, the mechanisms for pairing devices remain relatively primitive and do not take advantage of the rich variety of ways in which people and devices may interact with and among one another.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve receiving at least one sound, and pairing at least two devices as a result of the at least one sound. Pairing at least two devices as a result of the at least one sound may include and/or involve recognizing from the sound an identification of at least one of the devices, and/or extracting authentication information from the sound, and/or identifying at least one purpose, feature, attribute, and/or function from the sound and identifying at least one of the devices, and/or a pairing thereof, as providing the identified at least one purpose, feature, attribute, and/or function, and/or comparing information of the sound with a biometric voice print, and/or extracting from the sound both information needed to pair the devices and a biometric voice print, and/or analyzing voice information of the at least one sound, and/or identifying a type or types of the sound and selecting the devices to pair at least in part according to the type or types of the sound, and/or identifying a type or types of the sound and determining an extent of pairing of the devices at least in part according to the type or types of the sound, and/or determining a level and/or variation of at least one of volume, pitch, or tone of the sound, and selecting at least one of the devices to pair, and/or an extent of pairing, accordingly. Identifying at least one purpose, feature, attribute, and/or function from the sound and identifying at least one of the devices, and/or a pairing thereof, as providing the identified at least one purpose, feature, attribute, and/or function may include and/or involve at least one of identifying when at least one of the devices was purchased, identifying a status of at least one device, identifying an existing relationship between devices, identifying at least one device pairing history, identifying a manufacturer of at least one device, identifying a place of manufacture for at least one device, identifying a year of manufacture or version for at least one device, or identifying a location of at least one device. Analyzing voice information of the at least one sound may include and/or involve identifying words and/or phrases from the voice information, and/or identifying, from the voice information, an individual that is the source of the voice information. Identifying a type or types of the sound may include and/or involve identifying at least one of a whistle, a click, a clap, a knock, a snap, a ring, or a tone.

The method may include and/or involve discontinuing pairing of the at least two devices. Discontinuing pairing at least partially because the at least two devices may include and/or involve discontinuing pairing when the at least two devices are no longer proximate with one another, and/or discontinuing pairing of the at least two devices at least partially because of completion of a task, and/or discontinuing pairing at least partially because an amount of authorized pairing time lapses, and/or discontinuing pairing at least partially due to a user selection to discontinue pairing. Discontinuing pairing of the at least two devices as a result of completion of a task may include and/or involve discontinuing pairing of the at least two devices at least partially because of at least one of placing a call, transferring a file, sending a message, or performing a backup.

The method may include and/or involve retaining information about the pairing of the at least two devices.

The method may include and/or involve applying the retained information to resume pairing of the at least two devices, after pairing of the at least two devices is discontinued and/or interrupted. Applying the retained information to resume pairing of the at least two devices, after pairing of the at least two devices is discontinued and/or interrupted may include and/or involve applying the retained information to resume pairing of the at least two devices once the at least two devices are once again in proximity, and/or applying the retained information to resume pairing of the at least two devices, once the at least two devices are once again in communication with one another.

The method may include and/or involve detecting proximity between the devices and interpreting at least one sound, in conjunction with proximity between the devices, as an indication that pairing of the devices should be attempted.

The method may include and/or involve detecting increasing proximity between the devices and interpreting at least one sound, in conjunction with recently detected increasing proximity between the devices, as an indication that pairing of the devices should be attempted.

The method may include and/or involve the devices wirelessly exchanging information needed for pairing, upon approaching or becoming proximate with one another, but prior to receiving at least one sound, and interpreting the at least one sound as an indication that the exchanged information should be applied to complete the pairing process.

The method may include and/or involve logic to interpret the sound as an indication to initiate exchange with the other device of at least some of authentication, authorization, or compatibility information needed for pairing.

The method may include and/or involve un-pairing the devices as a result of a same or different sound or sounds.

The method may include and/or involve authenticating and/or authorizing pairing of the devices.

The method may include and/or involve establishing a secure channel for communication of pairing information.

The method may include and/or involve ascertaining relative motion between two or more of the devices. Ascertaining relative motion between two or more of the devices may include and/or involve ascertaining at least one of rotation, angle of approach, or relative lateral motion between the two or more devices.

The method may include and/or involve detecting a duration of the sound and applying the duration of the sound as an indication of to what extent and/or whether pairing of the devices should take place.

The method may include and/or involve detecting multiple sounds and applying the multiple sounds as an indication of to what extent and/or whether pairing of the devices should proceed.

The method may include and/or involve detecting an intensity of sound and applying the intensity of sound as an indication of to what extent and/or whether pairing of the devices should proceed. Detecting an intensity of sound and applying the intensity of sound as an indication of to what extent and/or whether pairing of the devices should proceed may include and/or involve detecting at least one of an average volume, a peak volume, or a volume gradient of the sound or sounds.

The method may include and/or involve communicating with at least one device different than the devices to pair, to obtain information needed to effect pairing of the devices. The at least one device different than the devices to pair may include and/or involve at least one of a proximate desktop, a laptop, or a handheld computing device.

The method may include and/or involve awaiting user input as a result of the sound or sounds. Awaiting user input as a result of the sound or sounds may include and/or involve awaiting authentication information for the user, and/or awaiting at least one of input from a keypad, voice input, or biometric input.

The method may include and/or involve pairing the devices to an extent determined by qualities and/or circumstances of the sound or sounds. Pairing the devices to an extent determined by qualities and/or circumstances of the sound or sounds may include and/or involve pairing to enable functions and/or features of one or both devices, or the combination thereof, determined by qualities and/or circumstances of the sound or sounds, and/or authorizing that a person or persons using one or both devices is authorized to do so, and/or to what extent.

The method may include and/or involve providing one or more audible and/or visual and/or tactile indications on the progress and/or results of pairing of the devices. Providing one or more audible and/or visual and/or tactile indications on the progress and/or results of pairing of the devices may include and/or involve presenting pairing options to a user of the devices, and/or providing an indication that a user should provide input to the pairing process, and/or providing at least one of one or more lights, tones, vibrations, sounds, or display indications, and/or providing at least one of an indication that pairing was successful, an indication that pairing was unsuccessful due to insufficient available information, an indication that pairing between the devices is available, or an indication that pairing is in process. Presenting pairing options to a user of the devices may include and/or involve presenting at least one of a visual menu or voice prompts. Presenting pairing options may include and/or involve presenting options relevant to the way the pairing is accomplished, presenting options for parameters of the pairing, or presenting options for one or more tasks and/or functions served by the pairing. Presenting options for parameters of the pairing may include and/or involve presenting options for pairing duration, location constraints, or conditions for terminating pairing.

Providing an indication that a user should provide input to the pairing process may include and/or involve providing an indication that the user should provide at least one of a password, a spoken input, a selection of an option, a biometric input, or information from a card and/or memory device.

The method may include and/or involve receiving a user selection from among the presented pairing options, and proceeding with pairing according to the user selection.

A device may include and/or involve a sound sensor, and logic to enable the device to ascertain and/or identify, from signals received via the sound sensor, at least one of pairing information, at least one other device with which to pair, a person effecting pairing of the device with the at least one other device, or an extent to which to pair with the at least one other device. The logic to enable the device to ascertain and/or identify, from signals received via the sound sensor, at least one of pairing information, at least one other device with which to pair, a person effecting pairing of the device with the at least one other device, or an extent to which to pair with the at least one other device may include and/or involve logic to recognize from the signals an identification of at least one device with which to pair, and/or logic to extract user authentication information from the signals, and/or logic to identify at least one purpose and/or function and/or feature from the signals, and to identify at least one device providing the identified at least one purpose and/or function and/or feature, and/or logic to compare information of the signals with a biometric voice print, and/or logic to extract from the signals both information to identify at least one device with which to pair, and a biometric voice print, and/or logic to analyze the signals as voice information, and/or logic to identify a type of sound represented by the signals, and/or logic to determine a level and/or variation or at least one of volume, pitch, or tone of sound represented by the signals. The logic to analyze the signals as voice information may include and/or involve logic to identify words and/or phrases from the signals, and/or logic to identify, from the signals, an individual that is the source of voice information represented by the signals. The logic to identify a type of sound represented by the signals may include and/or involve logic to identify at least one of a whistle, a click, a clap, a knock, a snap, a ring, or a tone.

The device may include and/or involve logic to detect proximity between the device and at least one other device, and to interpret at least one sound represented by the signals, in conjunction with proximity between the devices, as an indication that pairing of the device with at least one other device should be attempted.

The device may include and/or involve logic to detect increasing proximity between the device and the at least one other device, and to interpret at least one sound represented by the signals, in conjunction with recently detected increasing proximity between the device and the at least one other device, as an indication that pairing of the device with the at least one other device should be attempted.

The device may include and/or involve logic to enable the device to wirelessly receive information needed for pairing, upon approaching or becoming proximate with the at least one other device, but prior to receiving signals representing at least one sound, and logic to interpret the at least one sound as an indication that the received information should be applied to complete pairing with the at least one other device.

The device may include and/or involve logic to interpret the signals as an indication to initiate exchange with the at least one other device of at least some of authentication, authorization, or compatibility information needed for pairing.

The device may include and/or involve logic to unpair the device from the at least one other device, as a result of receiving signals representing one or more sounds.

The device may include and/or involve logic to enable the device to exchange with the at least one other device, during and/or proximate to a duration of the signals representing one or more sounds, information needed for pairing.

The device may include and/or involve logic to authenticate and/or authorize pairing of the device with one or more other devices.

The device may include and/or involve logic to establish a secure channel for communication of pairing information.

The device may include and/or involve logic to ascertain relative motion between the device and the at least one other device. The logic to ascertain relative motion between the device and the at least one other device may include and/or involve logic to ascertain at least one of rotation, angle of approach, or relative lateral motion between the device and the at least one other device.

The device may include and/or involve logic to detect a duration of the sound represented by the signals and to interpret the duration of the sound as an indication of to what extent and/or whether pairing of the device with the at least one other device should be accomplished.

The device may include and/or involve logic to detect multiple sounds from the signals and to interpret the multiple sounds as an indication of to what extent and/or whether pairing of the devices should be accomplished.

The device may include and/or involve logic to detect an intensity of sound represented by the signals, and to interpret the intensity of sound as an indication of to what extent and/or whether pairing of the devices should be accomplished. The logic to detect an intensity of sound represented by the signals, and to interpret the intensity of sound as an indication of to what extent and/or whether pairing of the devices should be accomplished may include and/or involve logic to detect at least one of an average volume, a peak volume, or a volume gradient.

The device may include and/or involve logic to communicate with the at least one device different than the devices to pair, to obtain information needed to effect pairing of the devices. The at least one device different than the devices to pair may include and/or involve at least one of a proximate desktop, a laptop, or a handheld computing device.

The device may include and/or involve logic to await user input as a result of the signals representing sound. The logic to await user input as a result of the signals representing sound may include and/or involve logic to await authentication information for a user of the device, and/or logic to await at least one of input from a keypad, a voice input, or a biometric input.

The device may include and/or involve logic to authorize an extent of pairing of the device and the at least one other device. The logic to authorize an extent of pairing of the device and the at least one other device may include and/or involve logic to authorize paired access to a greater number and/or different functions of one or more than one of the devices to pair, than would be available if the devices were paired without application of the signals representing sound, and/or logic to authorize paired access the extent of which varies according to the nature of the sound represented by the signals, and/or logic to authorize that a person using one or more of the devices to pair is authorized to do so, and/or to what extent.

The device may include and/or involve logic to provide one or more audible and/or visual and/or tactile indications on the progress and/or results of pairing of the device and the at least one other device. The logic to provide one or more audible and/or visual and/or tactile indications on the progress and/or results of pairing of the device and the at least one other device may include and/or involve at least one presentation of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing is available, or an indication that pairing is in process. The logic to provide an indication that a user should provide input to the pairing process may include and/or involve logic to provide an indication that the user should provide at least one of a password, a spoken input, a biometric input, a selection of a pairing option, or information from a card and/or memory device.

A system may include and/or involve a first device, a second device, and logic to enable the first and second devices to pair as a result of at least one sound. The logic to enable the first and second devices to pair as a result of at least one sound may include and/or involve logic to recognize from the sound an identification of at least one of the first and second devices, and/or logic to extract authentication information from the sound, and/or logic to identify at least one purpose and/or function from the sound and to identify at least one of the first and second devices as providing the identified at least one purpose and/or function, and/or logic to compare information of the sound with a biometric voice print, and/or logic to extract from the sound both information to identify the first and/or second devices and a biometric voice print, and/or logic to analyze voice information, and/or logic to identify a type of the sound, and/or logic to determine a level and/or variation or at least one of volume, pitch, or tone of the sound. The logic to analyze voice information may include and/or involve logic to identify words and/or phrases from the voice information, and/or logic to identify, from the voice information, an individual that is the source of the voice information. The logic to identify a type of the sound may include and/or involve logic to identify at least one of a whistle, a click, a clap, a knock, a snap, a ring, or a tone.

The system may include and/or involve logic to detect proximity between the devices and to interpret at least one sound, in conjunction with proximity between the devices, as an indication that pairing of the devices should be attempted.

The system may include and/or involve logic to detect increasing proximity between the devices and to interpret at least one sound, in conjunction with recently detected increasing proximity between the devices, as an indication that pairing of the devices should be attempted.

The system may include and/or involve logic to enable the devices to wirelessly exchange information needed for pairing, upon approaching or becoming proximate with one another, but prior to receiving at least one sound, and logic to interpret the at least one sound as an indication that the information should be applied to complete the pairing process.

The system may include and/or involve logic to interpret the sound as an indication to initiate exchange with the other device of at least some of authentication, authorization, or compatibility information needed for pairing.

The system may include and/or involve logic to unpair the devices as a result of the same or different sound or sounds.

The system may include and/or involve logic to authenticate and/or authorize pairing of the devices.

The system may include and/or involve logic to establish a secure channel for communication of pairing information.

The system may include and/or involve logic to ascertain relative motion between the devices. The logic to ascertain relative motion between the devices may include and/or involve logic to ascertain at least one of rotation, angle of approach, or relative lateral motion between the devices.

The system may include and/or involve logic to detect a duration of the sound and to interpret the duration of the sound as an indication of how and/or whether pairing of the devices should proceed.

The system may include and/or involve logic to detect multiple sounds and to interpret the multiple sounds as an indication of how and/or whether pairing of the devices should proceed.

The system may include and/or involve logic to detect an intensity of sound and to interpret the intensity of sound as an indication of how and/or whether pairing of the devices should proceed. The logic to detect an intensity of sound and to interpret the intensity of sound as an indication of how and/or whether pairing of the devices should proceed may include and/or involve logic to detect at least one of an average volume, a peak volume, or a volume gradient.

The system may include and/or involve logic to communicate with at least one device different than the devices to pair, to obtain information needed to effect pairing of the devices. The at least one device different than the devices to pair may include and/or involve at least one of a proximate desktop, a laptop, or a handheld computing device.

The system may include and/or involve logic to await user input as a result of the sound. The logic to await user input as a result of the sound may include and/or involve logic to await authentication information for the user, and/or logic to await at least one of input from a keypad, a voice input, or a biometric input.

The system may include and/or involve logic to authorize an extent of pairing of the devices. The logic to authorize an extent of pairing of the devices may include and/or involve logic to authorize paired access to a greater number and/or different functions of one or both devices than would be available if the devices were paired without application of the sound, and/or logic to authorize paired access the extent of which varies according to the nature of the sound, and/or logic to authorize that a person using one or both devices is authorized to do so, and/or to what extent.

The system may include and/or involve logic to provide one or more audible and/or visual and/or tactile indications on the progress and/or results of pairing of the devices. The logic to provide one or more audible and/or visual and/or tactile indications on the progress and/or results of pairing of the devices may include and/or involve logic to provide at least one presentation of pairing options, and/or logic to provide an indication that a user should provide input to the pairing process, and/or logic to provide at least one of one or more lights, tones, vibrations, sounds, or display indications, and/or at least one of logic to provide an indication that pairing was successful, an indication that pairing was unsuccessful due to insufficient available information, an indication that pairing between the devices is available, or an indication that pairing is in process. The logic to provide an indication that a user should provide input to the pairing process may include and/or involve logic to provide an indication that the user should provide at least one of a password, a spoken input, a biometric input, a user selection of a pairing option, or information from a card and/or memory device.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to affect the operation of a device. Software, hardware, and firmware are examples of logic. Hardware logic may be embodied in circuits. In general, logic may comprise combinations of software, hardware, and/or firmware.

Figure 1:
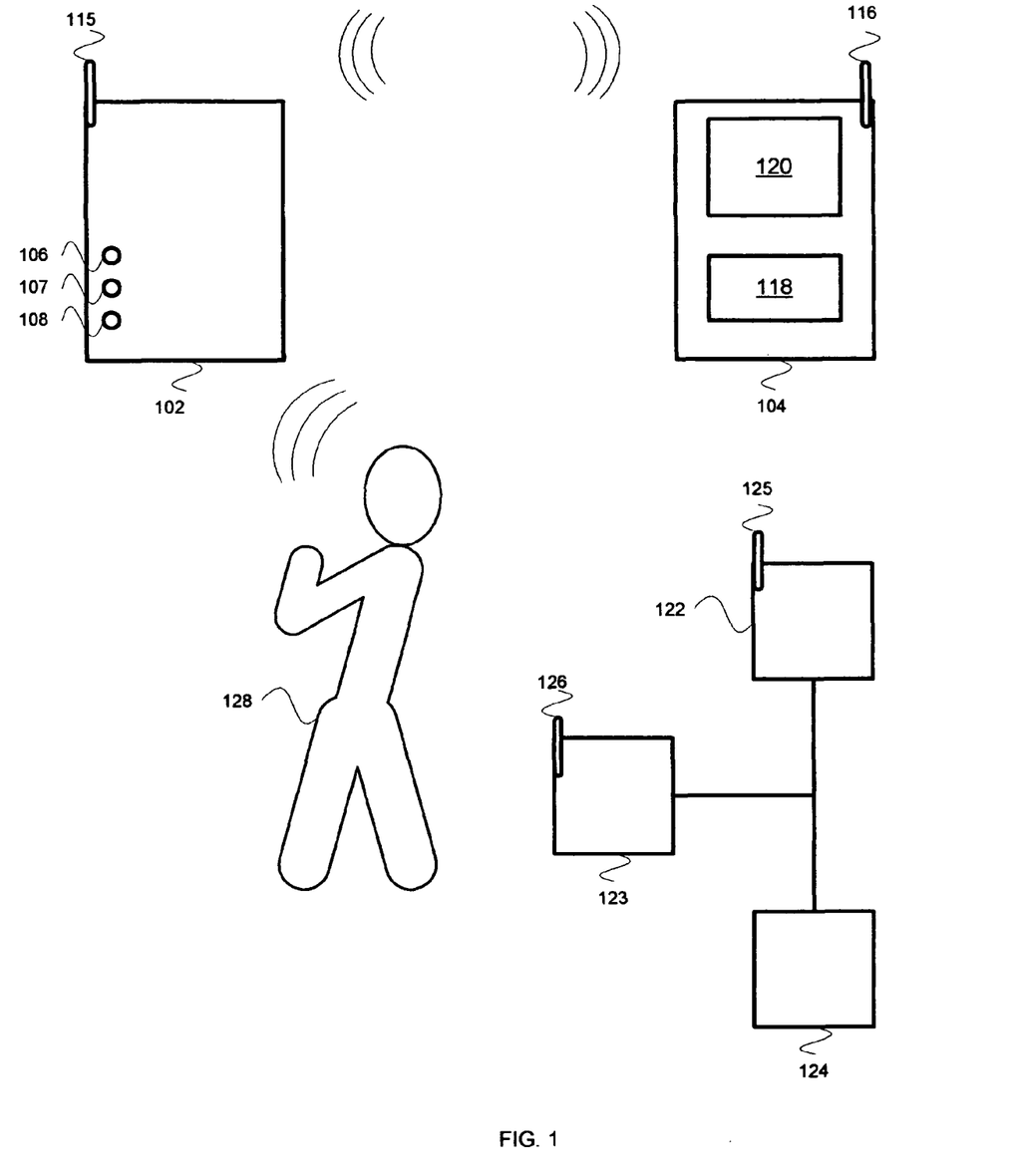
FIG. 1 is a block diagram of an embodiment of a device pairing arrangement.

Overview of FIG. 1

FIG. 1 is a block diagram of an embodiment of a device pairing arrangement. The system may include and/or involve a first device 102, a second device 104, and logic 118 to enable the first and second devices 102 and 104 to pair as a result of at least one sound.

The first device 102 includes a microphone 106, a speaker 107, a LED 108, and an antenna 115. The microphone 106 is used for sound input to the device 102. Sound input may include sounds such as tapping or voice input such as whistling or speaking. Sound input of at least one sound may be generated by a second device 104 or another device (not shown). For example, an individual located remotely to the device 102 may use a speaker located in the room where device 102 is to effect pairing between the first device 102 and a second device 104. Sound input of at least one sound may be created by an individual 128 to effect pairing. Sound input may be used, at least in part, to identify one or both devices 102 and 104, to enter commands, to provide authentication information, and/or to provide authorization information.

Voice input may be processed into words and/or phrases, and/or it may be processed as a sound pattern (e.g. a voice print). Voice input may be used, at least in part, as a biometric for individual identification.

The speaker 107 and LED 108 may be used to convey audible and/or visual information from the device 102. Information conveyed from the device 102 may include requests that an individual perform an action, and/or feedback on the condition of some operation the device 102 may have performed or may be performing (e.g. a status of pairing). The speaker 107 and/or LED 108 may not be present in all embodiments. Other mechanisms of communicating information such as a buzzer, display, or tactile surface may be present additionally or instead of the speaker 107 and/or LED 108.

Feedback may be communicated to the user in various ways, such as those described above using speakers, LEDs, other device outputs, or via some other proximate device such as device 122.

The device 102 may include an antenna 115 for wireless communication with other devices. The device 102 may include other features such as a scanner, a camera, or cellular telephone capabilities.

Examples of devices 102 and 104 include a medallion or wearable jewelry, headphones, a telephone and/or telephone base station, a personal digital assistant (PDA) incorporating a display, a camera, a keyboard, a scanner, a cellular telephone, and many others. Laptop and palmtop computers are also possibilities.

A second device 104 includes an antenna 116, logic 118, and a display 120, among other elements. The antenna 116 enables wireless communication between the device 104 and other devices.

The device 104 need not include a display 120, although a display may prove useful for certain aspects of the pairing process. The display 120 could be part of the first device 102, or some other device such as device 122.

The logic 118 operates to effect techniques of the device pairing arrangement and acts for pairing devices 102 and 104. The logic 118 may exist on the first device 102, the second device 104, or in part on both devices 102 and 104. The logic 118 may exist, at least in part, on other devices, such as devices 122 and/or 124. The devices 122 and 124 may comprise a proximate laptop, a desktop, or other computing device, and/or supporting network and communication equipment.

The logic 118 to enable the first and second devices 102 and 104 to pair as a result of at least one sound may include and/or involve logic to recognize from sound an identification of at least one of the first and second devices.

The logic 118 may also or alternatively include and/or involve logic to extract authentication information from the sound. It may be advantageous, in certain implementations, to include and/or involve logic to identify at least one purpose and/or function from the sound, and/or to identify from the sound at least one of the first and second devices 102 and 104 as providing at least one purpose and/or function. In certain implementations, logic may be present to compare information of the sound with a biometric voice print.

The logic 118 may also or alternatively include and/or involve logic to extract from the sound both information to identify the first and/or second devices 102 and 104 and a biometric voice print. It may be advantageous, in certain implementations, to include and/or involve logic to analyze voice information. The logic to analyze voice information may include and/or involve logic to identify words and/or phrases from the voice information. The logic to analyze voice information may also or alternatively include and/or involve logic to identify, from the voice information, an individual that is the source of the voice information.

The logic 118 may also or alternatively include and/or involve logic to identify a type of the sound. It may be advantageous, in some implementations, to include and/or involve logic to determine a level and/or variation or at least one of volume, pitch, or tone of the sound. The logic to identify a type of the sound may include and/or involve logic to identify at least one of a whistle, a click, a clap, a knock, a snap, a ring, or a tone.

The display 120 may be used to provide information to an individual or individuals such as the person or persons touching the devices 102, 104. In some embodiments, other mechanisms of communicating information such as an LED, buzzer, or speaker may be present additionally or instead of the display 120 on either or both of devices 102 and 104, and/or a proximate device such as 122.

The devices 102 and/or 104 may include other features not described herein. The devices 102 and/or 104 may include a laptop, desktop, tower, or server computer attached via wireless or wired communications to an Intranet and/or the Internet and providing, for example, a sophisticated application such as a medical patient monitoring station or machine control application for a machine tool.

The device pairing arrangement may also include additional devices, such as devices 122, 123, and 124. Various data, logic, resources, and capabilities, including information and logic, to accomplish the pairing process may be provided by these other devices 122, 123, and 124. The devices 102 and/or 104 to pair may communicate with one or more of the devices 122-124 using wireless or other types of communication during the pairing process.

By way of example, the device 123 may provide a network access point for a wired and/or wireless network. Thus, for example, the device 123 may include an antenna 125. The antenna 125 may enable one or both of devices 102, 104 to communicate via a network with other devices, such as device 124, located remotely from devices 102, 104. Such communication may enable devices 102 and/or 104 to receive additional information from device 124 that may assist in the pairing process. Some of the logic 118 used to effectuate pairing including even in some cases the decision to pair may be embodied in a remote device or devices 124.

Pairing

The device pairing arrangement includes a first device 102, a second device 104, and logic 118 to effect pairing of devices 102, 104 upon detection that a sound or sounds has been input to device 102. The sound may provide an indication that pairing should be effected. Herein, such sound or sounds may also be referred to as "pairing sound".

Some functions of the logic 118 may be exercised at various times, depending on the implementation. For example, when devices 102 and 104 possess wireless capabilities, they may exchange some information prior to as well as potentially during and/or after the pairing sound is input. In some embodiments, both device 102 and device 104 include logic 118 to recognize the pairing sound. In some situations, devices 102 and 104 may both recognize the pairing sound in order for pairing to be effected.

Effecting pairing may involve actions such as identifying either one or both devices 102, 104 or one or more device characteristics, features, and/or functions; identifying (authenticating) the person or some characteristic of the person using the devices 102, 104; authorizing the pairing and/or to what extent; and configuring one or both of the devices 102, 104 with settings and information to facilitate paired operation. In some embodiments, the devices 102 and 104 may receive all information needed to effect pairing via microphones.

The two devices 102 and 104 may cooperate in order to effect pairing, such cooperation generally involving communication between the devices 102 and 104.

Effectuating pairing involves communication of information. Information may be communicated in various ways, including wirelessly, or using some wired communication method, or combinations thereof. The devices 102 and 104 may also communicate using sound. For example, if device 104 has a speaker (not shown) it might communicate its functional capabilities and the authorization information it requires prior to allowing use of those capabilities to device 102 using its speaker. Device 102 may use its microphone 106 to receive the information.

Information to facilitate pairing may be communicated between the two devices 102, 104, or almost entirely from one device to another. For example, device 102 may consist of a medallion or ring with containing stored value (similar in concept to a prepaid phone card) which is used primarily to accomplish a commercial transaction. After a person speaks commands to device 102 indicating that it should pair with device 104 in order to accomplish a purchase, device 102 may use its antenna 115 to pass information about the stored value to device 104. Device 104 may then perform many, most, or all actions involved necessary to establish pairing, such as identifying the commercial transaction and deciding if it may be accomplished. (The user may be interacting through a touch screen display 120 or keyboard or verbally with device 104 during this period.) Device 104 may then initiate pairing. While the two devices are paired, device 104 may pass information about the commercial transaction back to device 102.

The information exchanged, and the direction of such exchange, may vary as pairing proceeds. For example, the device 102 might pass information about a desired common purpose to the device 104, along with information about its 102 capabilities. The device 104 may determine if it is suitable to provide the common service with device 102, and notify device 102 of this decision. The device 102 may then pass information authenticating the person using it to the device 104 and so on.

At times, effectuation of pairing may require an individual to provide an input to one or both of the devices 102, 104, or to perform an action. For example, the user of the device 102 and/or 104 may have to enter a password or provide a biometric input before pairing will be accomplished. The user may have to speak his or her name, to be validated biometrically. The individual may have to present a finger to a scanner for biometric fingerprint identification.

Effectuation of pairing may in some instances involve access to information and processing capability external to the two pairing devices 102, 104. For example, if an individual provides a biometric fingerprint input to device 102, it 102 may use the antenna 115 to communicate the fingerprint information wirelessly to device 123 via the antenna 126. Device 123 may then provide the fingerprint information, via a network, to device 124 for authentication and authorization of the user's permission to pair device 104 with device 102.

The information needed to effect pairing may be passed using a variety of physical medium. The devices 102 and 104 may communicate some or all of the information needed to effect pairing using microphones 106 and speakers 107, as discussed in the example above. The devices 102 or 104 may communicate using their wireless capabilities. Either or both of devices 102, 104 may implement wired or wireless network connectivity, so that some or all of the information needed to effect pairing may be communicated to one or both devices via a communication network.

One or both devices 102 and 104 may be paired with some other device (not shown) at the time the pairing sound is recognized by device 102. Depending on the circumstances, the original pairing or pairings may be terminated, and a pairing between the devices 102 and 104 effected. Or, a second pairing may occur between devices 102 and 104 and one or more original pairings may continue. In some circumstances, when device 102 recognizes the pairing sound, pairing may be rejected if one or both devices 102 and 104 are already paired.

Proximity

The system may include and/or involve logic to detect proximity between the devices 102 and 104 and to interpret at least one sound, in conjunction with proximity between the devices 102 and 104, as an indication that pairing of the devices should be attempted.

The system may include and/or involve logic 118 to detect increasing proximity between the devices 102 and 104 and to interpret at least one sound, in conjunction with recently detected increasing proximity between the devices 102 and 104, as an indication that pairing of the devices should be attempted.

The system may include and/or involve logic 118 to enable the devices 102 and 104 to wirelessly exchange information needed for pairing, upon approaching or becoming proximate with one another, but prior to receiving at least one sound, and logic 118 to interpret the at least one sound as an indication that the information should be applied to complete the pairing process.

Authentication and Authorization

The system may include and/or involve logic 118 to interpret the pairing sound as an indication to initiate exchange with the other device 102 or 104 of at least some of authentication, authorization, or compatibility information needed for pairing.

The system may include and/or involve logic 118 to authenticate and/or authorize pairing of the devices.

The system may include and/or involve logic 118 to establish a secure channel for communication of pairing information.

Authenticating and/or authorizing the pairing may include identifying one or both devices 102, 104 and/or identifying at least one device characteristic for one or both devices 102, 104, such as determining whether the devices 102, 104 are suitable for use for the purpose required and that they 102, 104 are compatible for pairing to accomplish that purpose. For example, pairing may have been initiated with a goal of accomplishing a commercial transaction requiring secure communication. Both devices 102, 104 may have a device characteristic of supporting one or more varieties of encryption. However, devices 102 and 104 may support only DES encryption in common. The recognition that the devices 102 and 104 are compatible and that DES encryption should be employed may occur as a result of the information exchanged during the pairing effectuation process.

The system may include and/or involve logic 118 to authorize an extent of pairing of the devices 102 and 104. The logic 118 to authorize an extent of pairing may include and/or involve logic to authorize paired access to a greater number and/or different functions of one or both devices 102 and 104 than would be available if the devices 102 and 104 were paired without application of the sound. The logic 118 to authorize an extent of pairing may also or alternatively include and/or involve logic to authorize paired access the extent of which varies according to the nature of the sound.

For example, the device 102 may include a radio tuner and it might be paired with either a sound system or a computer, or both simultaneously. All may be located in a dormitory common room. A student may issue a voice command to play a certain radio station using the sound system. If device 102 is not paired at the time that command is received, the pairing with the sound system may be effected and the station indicated by the student may be played. However, when device 102 is paired with the computer, a voice command to initiate playing of a radio station using the sound system may be accepted but the currently playing radio station may be used, not the one indicated by the student. This would be a pairing of device 102 with both the sound system and the computer, enabling both to receive the radio input. If, on the other hand, the pairing sound (in this case actually sounds) includes a separate word that acts as a voice print to identify the user prior to the command word, and the user is authorized, the pairing sound may act to break the pairing with the computer and effect pairing with the sound system. The sound system would be provided the radio station input indicated by the command. This would assure that only responsible people, such as authorized users of the computer, would be affecting inputs to the computer (i.e. the radio input).

As a second example, in a machine shop a machine operator may be able to communicate "hands free" with a device 102 to initiate pairing. Three whistles of short duration may indicate pairing with device 104 using previous configuration information, whereas a whistle of long duration may indicate pairing with device 104 and ask device 104 to receive updated configuration information over a network.

The logic 118 to authorize an extent of pairing may include and/or involve logic to authorize that a person using one or both devices 102 and 104 is authorized to do so, and/or to what extent. Authenticating and/or authorizing pairing may include identifying the user who has communicated the pairing sound and/or identifying at least one characteristic of the user. For example, the user may be a member of a group, department, or organization, such as a computer network administrator with broad access privileges.

Authorization of pairing, authorization of an extent of pairing, and determination of the need for secure communication during the effecting of pairing may be based, at least in part, on other factors such as time of day or location. For example, device 102 and device 104 may effect pairing even though device 102 cannot support secure communications if they are in a certain location, such as a computer room, considered to be secure. However, if device 102 cannot support secure communications with device 104 and the location of device 102 is considered insecure (such as an Internet café), the logic 118 to effect pairing may reject pairing. In some cases, the user, by the nature of sound he provides when effecting pairing, may be able to override the decision of the logic 118 not to allow insecure communication to effect pairing. For example, the user may provide a "secret sound" at the beginning or end of the sounds that initiate pairing, and use of the secret sound may indicate "do it anyway".

Feedback

The system may include and/or involve logic 118 to provide one or more audible and/or visual and/or tactile indications on the progress and/or results of pairing of the devices 102 and 104. The logic 118 to provide indications on the progress and/or results of pairing may include and/or involve logic to provide at least one presentation of pairing options.

The logic 118 to provide indications on the progress and/or results of pairing may include and/or involve logic to provide an indication that a user should provide input to the pairing process. Such inputs could include speech, keyboard entry, pressing a switch, or performing a scan. The logic 118 to provide an indication that a user should provide input to the pairing process may include and/or involve logic to indicate that the user should provide at least one of a password, spoken input, biometric input, a user selection of a pairing option, or information from a card and/or memory device.

The logic 118 to provide indications on the progress and/or results of pairing may also or alternatively include and/or involve logic to provide at least one of one or more lights, tones, vibrations, sounds, or display indications.

The logic 118 to provide indications on the progress and/or results of pairing may include and/or involve at least one of logic to provide an indication that pairing was successful, an indication that pairing was unsuccessful due to insufficient available information, an indication that pairing between the devices 102 and 104 is available, or an indication that pairing is in process.

Factors Affecting Pairing

The system may include and/or involve logic 118 to ascertain various factors that may affect the pairing process, such as relative motion between the devices. For example, the logic 118 may ascertain at least one of rotation, angle of approach, or relative lateral motion between the devices. Information about relative motion may be applied for various purposes, including authentication and/or authorization. For example, the user may be required to swing the device 102, such as a medallion or cellular phone, to and fro during a time proximate to the issuing of the pairing sound. This may help ensure that the pairing sound is purposeful to initiate pairing.

The system may include and/or involve logic 118 to detect a duration of the sound and to interpret the duration of the sound as an indication of how and/or whether pairing of the devices should proceed. The logic 118 to detect sound duration may include logic to interpret sound duration information for authentication and/or authorization purposes.

The system may include and/or involve logic 118 to detect multiple sounds and to interpret the multiple sounds as an indication of how and/or whether pairing of the devices should proceed. The logic 118 to detect multiple sounds may include logic to interpret multiple sound information for authentication and/or authorization purposes.

The system may include and/or involve logic 118 to detect an intensity of sound and to interpret the intensity of sound as an indication of how and/or whether pairing of the devices should proceed. The logic 118 to detect sound intensity information may include logic to interpret sound intensity information for authentication and/or authorization purposes. The logic to detect an intensity of sound and to interpret the intensity of sound as an indication of how and/or whether pairing of the devices should proceed may include and/or involve logic to detect at least one of an average volume, a peak volume, or a volume gradient.

Other Devices

The system may include and/or involve logic 118 to communicate with at least one device 122 or 124 different than the devices 102 and 104 to be paired, to obtain information needed to effect pairing. The at least one different device 122 or 124 may include and/or involve at least one of a proximate desktop, a laptop, or a handheld computing device. A device or devices 122 and 124 remote from both of the pairing devices 102 and 104 may also be included or involved in the obtaining of information needed to effect pairing. The other device or devices 122 and 124 may be accessed wirelessly, or using wired communications. The other device or devices 122 and 124 may be accessed using a network such as an intranet or the Internet.

User Input

The system may include and/or involve logic 118 to await user input as a result of the pairing sound. The logic 118 to await user input as a result of the pairing sound may include and/or involve logic to await authentication information for the user. It may be advantageous, in certain implementations, for the logic 118 to await user input to include and/or involve logic to await at least one of input from a keypad, a voice input, a touch screen, or a biometric input.

Discontinuing Pairing

The system may include and/or involve logic 118 to terminate the pairing of the devices 102 and 104 as a result of the same or different sound or sounds. Logic 118 to terminate the pairing of two devices 102 and 104 may include logic to terminate the effectuation of pairing while pairing (i.e., to abort a pairing which is in progress). Logic 118 to terminate the pairing of two devices 102 and 104 may include logic to terminate the pairing of two paired devices. Logic 118 to terminate pairing may include logic to use authentication and/or authorization information in making the determination to terminate pairing.

Figure 2:
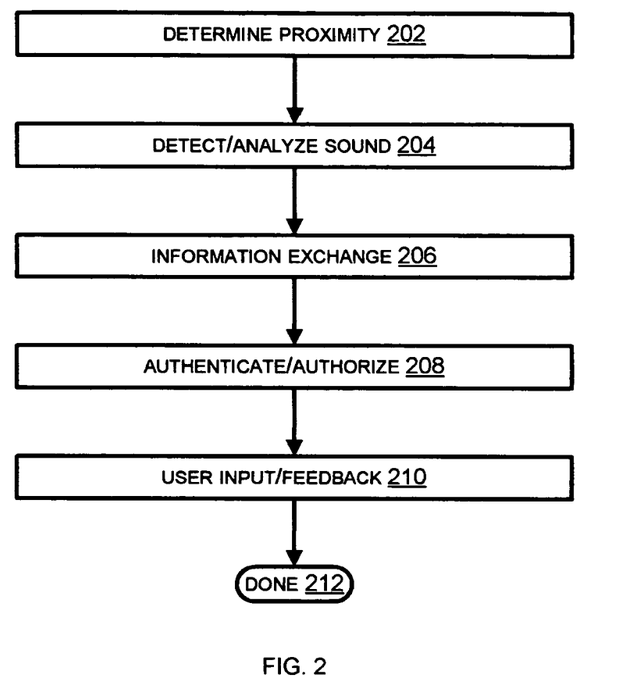
FIG. 2 is a flow chart of an embodiment of a device pairing method.

Overview of FIG. 2

FIG. 2 is a flow chart of an embodiment of a device pairing method. At 202, the devices are recognized as proximate. This may take place, for example, in situations where the devices communicate wirelessly prior to recognition of the device pairing sound.

At 204, one or both devices detect the device pairing sound. Information conveyed by the sound, possibly including information about the nature of the sound, may be analyzed.

At 206, information is exchanged between the two devices to effect pairing. As was previously noted, some or possibly all of this information may have been exchanged earlier in situations where the devices were communicating with each other prior to recognition of the pairing sound.

At 208, information obtained prior to, during, or after the sound is applied to authenticate and/or authorize the pairing of the devices.

At 210, feedback is provided to the user and user input obtained. Feedback and user input may occur as a part of the authentication and authorization process 208, or for other reasons.

At 212, the pairing effectuation process is complete.

Pairing Response to Sound

The method may include and/or involve receiving at least one sound, and pairing at least two devices as a result of the at least one sound. Pairing at least two devices as a result of the at least one sound may include and/or involve recognizing from the sound an identification of at least one of the devices. Pairing at least two devices may include and/or involve extracting authentication information from the sound. Pairing may include and/or involve identifying at least one purpose, feature, attribute, and/or function from the sound, such as identifying when at least one of the devices was purchased, identifying a status of at least one device, identifying an existing relationship between devices, identifying at least one device pairing history, identifying a manufacturer of at least one device, identifying a place of manufacture for at least one device, identifying a year of manufacture or version for at least one device, identifying a location of at least one device, and so on.

Pairing may include and/or involve comparing information of the sound with a biometric voice print, e.g. analyzing voice information of the at least one sound. Analyzing voice information of the at least one sound may include and/or involve identifying words and/or phrases from the voice information, and/or involve identifying, from the voice information, an individual that is the source of the voice information.

The pairing may involve identifying a type or types of the sound and determining an extent of pairing of the devices at least in part according to the type or types of the sound. A level and/or variation of at least one of volume, pitch, or tone of the sound may be determined, and at least one of the devices to pair, and/or an extent of pairing, may be selected accordingly. The type or types of sound may be identified, for example, as a whistle, a click, a clap, a knock, a snap, a ring, or a tone.

The devices may be paired to an extent determined by qualities and/or circumstances of the sound or sounds. Qualities and/or circumstances of the sound or sounds may determine which functions and/or features of one or both devices, or the combination thereof, are enabled for pairing. In certain implementations, the devices may be paired to an extent determined by qualities and/or circumstances of the sound or sounds, such as authorizing that a person or persons using one or both devices is authorized to do so, and/or to what extent.

Status/Progress Indications

One or more audible and/or visual and/or tactile indications may be provided on the progress and/or results of pairing of the devices. Providing one or more indications on the progress and/or results of pairing of the devices may include and/or involve presenting pairing options to a user of the devices, which may involve presenting at least one of a visual menu or voice prompts. Pairing options may include options relevant to the way the pairing is accomplished, presenting options for parameters of the pairing, or presenting options for one or more tasks and/or function served by the pairing. Parameters of the pairing may include options for pairing duration, location constraints, or conditions for terminating pairing.

An indication may be provided to a user to provide input to the pairing process. The user may be prompted to provide at least one of a password, a spoken input, a selection of an option, a biometric input, or information from a card and/or memory device, among other things.

It may be advantageous, in certain implementations, to provide one or more lights, tones, vibrations, sounds, or display indications to a user or users of the device(s). Such indications may indicate the progress and/or results of pairing, such as whether pairing was successful, unsuccessful due to insufficient available information, available, or in process.

Discontinuing Pairing

Pairing of the at least two devices may be discontinued under certain circumstances. Pairing of the at least two devices may be discontinued as a result of completion of a task, such as completion of placing a call, transferring a file, sending a message, or performing a backup.

Discontinuing pairing of the at least two devices may include and/or involve discontinuing pairing when the at least two devices are no longer proximate with one another.

Discontinuing pairing of the at least two devices may include and/or involve discontinuing pairing if an amount of authorized pairing time lapses.

Discontinuing pairing of the at least two devices may also or alternatively include and/or involve discontinuing pairing due to a user selection to discontinue pairing, and/or as a result of detecting a same or different sound or sounds that enabled pairing to begin with.

Retaining Pairing Information

Information about the pairing of the at least two devices may be retained and later applied to pair the devices.

The method may include and/or involve applying the retained information to resume pairing of the at least two devices, after pairing of the at least two devices is discontinued and/or interrupted. Pairing of the at least two devices may be resumed once the devices are once again in proximity with one another, and/or once the at least two devices are once again in communication with one another.

Proximity

Proximity between the devices may be detected. At least one sound, in conjunction with proximity between the devices, may provide an indication that pairing of the devices should be attempted.

Increasing proximity between the devices may be detected. At least one sound, in conjunction with recently detected increasing proximity between the devices, may provide an indication that pairing of the devices should be attempted.

The devices may wirelessly exchange information needed for pairing, upon approaching or becoming proximate with one another, but prior to receiving at least one sound. Detecting the at least one sound may provide an indication that the exchanged information should be applied to complete the pairing process.

Authentication and Authorization

The sound may provide an indication that the devices should exchange at least some of authentication, authorization, or compatibility information needed for pairing. By exchanging such information, the devices may establish a secure channel for communication of information.

Motion and Other Factors Affecting Pairing

Various other factors may also influence the pairing process, such as relative motion between two or more of the devices. Relative motion between the devices may include rotation, angle of approach, or relative lateral motion between the devices. The relative motion information may be applied as an indication of whether and/or to what extent pairing of the devices may take place. The relative motion information may be applied for authentication and/or authorization purposes.

The duration of the sound or sounds may be detected and applied as an indication of to what extent and/or whether pairing of the devices should take place, possibly for authentication and/or authorization purposes. Multiple sounds may be detected and applied as an indication of to what extent and/or whether pairing of the devices should proceed, possibly for authentication and/or authorization purposes.

The intensity of sound may be detected and applied as an indication of to what extent and/or whether pairing of the devices should proceed, and/or for authentication and/or authorization purposes. This may involve detecting at least one of an average volume, a peak volume, or a volume gradient of the sound or sounds.

Other Devices

Communicating may take place with at least one device different than the devices to pair, to obtain information needed to effect pairing of the devices. The at least one different device may include and/or involve at least one of a proximate desktop, a laptop, or a handheld computing device. The at least one different device may be located remotely from both of the devices to pair.

User Input

User input may be awaited as a result of the sound or sounds. Awaiting user input as may include and/or involve awaiting authentication information for the user, from at least one of input from a keypad, voice input, touch screen, or biometric input.

User input may include and/or involve awaiting a user selection from among pairing options. A user selection may be received from among the presented pairing options, and pairing may proceed according to the user selection.

Figure 3:
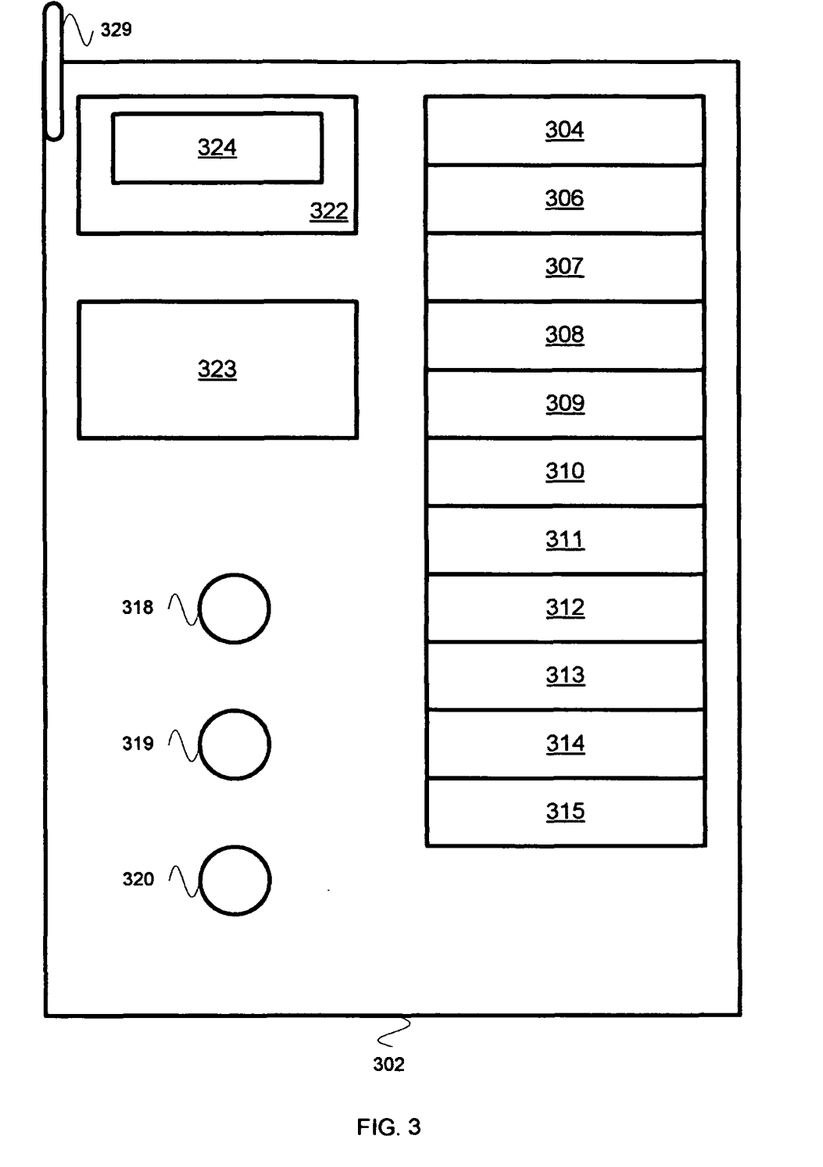
FIG. 3 is a block diagram of an embodiment of a device to accommodate pairing.

Overview of FIG. 3

FIG. 3 is a block diagram of an embodiment of a device to accommodate pairing. A device 302 includes a display 322 that may be used, among other things, to provide a menu 324 of pairing options. The device 302 includes a microphone 318 which may be used to detect sound (such as tapping) and/or voice input. The device 302 includes a keypad 323. The device 302 includes two parts which may be used to provide user feedback, a speaker 319 and a LED 320. The device 302 also includes various logic elements which may operate to effect device pairing. Of course, the device 302 may include additional elements that are not shown here and which may be superfluous to this discussion.

Device logic includes pairing process management logic 304, wireless communication logic 306, proximity and motion logic 307, user input logic 308, sound/speech processing logic 309, biometric processing logic 310, third device interface logic 311 to interact with a device or devices other that the two pairing devices, authentication logic 312, authorization logic 313, feedback logic 314, and logic 315 to discontinue pairing, retain pairing information, and/or reestablish/resume pairing under certain circumstances.

An antenna 329 enables the device 302 to engage in wireless communication.

Not all embodiments of the device 302 will include all of the illustrated logic. For example, if a device 302 had no biometric input it would not need and probably would not have biometric processing logic 310. If a device 302 did not need to involve and communicate with a third device (other than its pairing partner) to effect pairing, it may not have third device interface logic 311. And so on.

The device 102 may include and/or involve a sound sensor (the microphone 318), and logic to enable the device to ascertain and/or identify pairing information from signals received via the sound sensor, such as an identification of at least one other device with which to pair, a person effecting pairing of the device with the at least one other device, an extent to which to pair with the at least one other device, and so on.

The logic 304 and 306-315 may be applied to effect the operation of the device in accordance with actions previously described herein to effect pairing with at least one other device.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A system comprising:
   circuitry configured to detect proximity with at least one device;
   circuitry configured to receive at least one non-voice sound generated by the at least one device;
   circuitry configured to identify the at least one device based at least partly on at least one of sound type and variation of volume, pitch, and/or tone associated with at least one portion of the at least one non-voice sound;
   circuitry configured to determine authorization to pair based at least partly on duration of at least one portion of the at least one non-voice sound; and
   circuitry configured to effect pairing with the at least one device at least partly in response to the authorization to pair and to detected proximity with the at least one device.

2. The system of claim 1, wherein the circuitry configured to detect proximity with at least one device comprises:
   circuitry configured to detect proximity with at least one of the following types of devices: scanner, camera, cellular telephone, wearable article, headphone, telephone, telephone base station, personal digital assistant, laptop computer, palmtop computer, server, radio, and/or sound system.

3. The system of claim 1, wherein the circuitry configured to detect proximity with at least one device comprises:
   circuitry configured to detect proximity with at least one mobile telephone.

4. The system of claim 1, further comprising:
   circuitry configured to receive user input.

5. The system of claim 1, further comprising:
   circuitry configured to receive authentication input.

6. The system of claim 1, wherein the circuitry configured to effect pairing with the at least one device at least partly in response to the authorization to pair and to detected proximity with the at least one device comprises:
   circuitry configured to communicate with the at least one device at least partly in response to the authorization to pair and to detected proximity with the at least one device.

7. The system of claim 1, wherein the circuitry configured to effect pairing with the at least one device at least partly in response to the authorization to pair and to detected proximity with the at least one device comprises:
   circuitry configured to effect pairing with the at least one device to place a call, transfer a file, send a message, accomplish a commercial transaction, and/or perform a backup, at least partly in response to the authorization to pair and to detected proximity with the at least one device.

8. The system of claim 1, wherein the circuitry configured to receive at least one non-voice sound generated by the at least one device comprises:
   circuitry configured to receive at least one computer-generated synthesis from the at least one device.

9. The system of claim 1, wherein the circuitry configured to effect pairing with the at least one device at least partly in response to the authorization to pair and to detected proximity with the at least one device comprises:
   circuitry configured to effect pairing with the at least one device based at least partly on time of day and at least partly in response to the authorization to pair and to detected proximity with the at least one device.

10. The system of claim 1, wherein the circuitry configured to effect pairing with the at least one device at least partly in response to the authorization to pair and to detected proximity with the at least one device comprises:
    circuitry configured to effect pairing with the at least one device based at least partly on location and at least partly in response to the authorization to pair and to detected proximity with the at least one device.

11. The system of claim 1, wherein the system is incorporated into a wearable article.

12. The system of claim 1, further comprising:
circuitry configured to detect motion of the at least one device.

13. The system of claim 1, further comprising:
circuitry configured to detect relative motion of the at least one device.

14. The system of claim 1, further comprising:
circuitry configured to unpair the at least one device based at least partly on one or more sounds.

15. The system of claim 1, further comprising:
circuitry configured to unpair the at least one device at least partly in response to completion of at least one task, absence of proximity, and/or lapse of time.

16. The system of claim 1, further comprising:
circuitry configured to communicate feedback information.

17. The system of claim 1, further comprising:
circuitry configured to identify at least one purpose and/or function based at least partly on at least one portion of the at least one non-voice sound.

18. The system of claim 1, wherein the circuitry configured to receive at least one non-voice sound generated by the at least one device comprises:
circuitry configured to receive at least one ring sound generated by the at least one device.

19. The system of claim 1, wherein the circuitry configured to effect pairing with the at least one device at least partly in response to the authorization to pair and to detected proximity with the at least one device comprises:
circuitry configured to effect pairing with the at least one device at least partly in response to the authorization to pair and to detected proximity with the at least one device, at least partly using information received from at least one other device.

20. The system of claim 1, wherein the circuitry configured to effect pairing with the at least one device at least partly in response to the authorization to pair and to detected proximity with the at least one device comprises:
circuitry configured to effect pairing with the at least one device at least partly in response to the authorization to pair and to detected proximity with the at least one device, at least partly using previously retained information.

21. A method at least partly implemented using one or more processing components, the method comprising:
detecting proximity with at least one device;
receiving at least one non-voice sound generated by the at least one device;
processing the at least one non-voice sound including at least (i) identifying the at least one device based at least partly on at least one of sound type and variation of volume, pitch, and/or tone associated with at least one portion of the at least one non-voice sound, and (ii) determining authorization to pair based at least partly on duration of the at least one portion of the at least one non-voice sound; and
effecting pairing with the at least one device at least partly in response to determining authorization to pair and to detecting proximity with the at least one device.

22. One or more non-transitory computer readable media comprising:
one or more instructions for detecting proximity with at least one device;
one or more instructions for receiving at least one non-voice sound generated by the at least one device;
one or more instructions for processing the at least one non-voice sound including at least (i) identifying the at least one device based at least partly on at least one of sound type and variation of volume, pitch, and/or tone associated with at least one portion of the at least one non-voice sound, and (ii) determining authorization to pair based at least partly on duration of the at least one portion of the at least one non-voice sound; and
one or more instructions for effecting pairing with the at least one device at least partly in response to determining authorization to pair and to detecting proximity with the at least one device.

* * * * *